No. 763,266. Patented June 21, 1904.

UNITED STATES PATENT OFFICE.

CHARLES F. CROSS, OF LONDON, ENGLAND, ASSIGNOR TO DANIEL C. SPRUANCE, OF PHILADELPHIA, PENNSYLVANIA.

PROCESS OF PURIFYING VISCOSE.

SPECIFICATION forming part of Letters Patent No. 763,266, dated June 21, 1904.

Application filed November 9, 1903. Serial No. 180,471. (No specimens.)

*To all whom it may concern:*

Be it known that I, CHARLES FREDERICK CROSS, a subject of the King of Great Britain and Ireland, residing at 4 New Court, Lincolns Inn, London, England, have invented a certain new and useful Process of Purifying Viscose, of which the following is a specification, for which I have applied for a patent in Great Britain, dated September 30, 1903, No. 21,030; in Germany, dated October 19, 1903, and in France, dated August 14, 1903, No. 720.

Viscose, (the crude solution of cellulose xanthate,) which is prepared by the interaction of cellulose, alkaline hydroxid, and carbon bisulfid, is yellow, owing to the presence of alkaline by-products.

My invention relates to a process for purifying viscose by treating it so as to obtain from it cellulose xanthate in a form convenient for washing it, and thus removing the by-products which impart color to the viscose. For this purpose I take advantage of an observation which I have made—namely, that when the crude viscose has stood for a time at the ordinary temperature or when it is heated at temperatures at about 50° centigrade for a short time it attains a condition in which on addition of a solution of sodium bicarbonate the cellulose xanthate is precipitated. The precipitate is then further washed with sodium-bicarbonate solution to remove the yellow by-products. The fact that the precipitant is of alkaline reaction enables the purification to be effected without separation of sulfur. The method is economical, as sodium bicarbonate is very cheap and its saturated solution contains only eight to nine per cent. of the salt. Moreover, the alkaline salts removed from the crude viscose are also in large proportion capable of conversion into bicarbonates and are then available for use in the purification process.

For example, crude viscose freshly prepared and containing eight to ten per cent. of its weight of cellulose is heated for one to two hours at 50° centigrade, with constant stirring. It is then treated with twice its weight of a saturated solution of sodium bicarbonate, the separated solid being broken up by agitation as the precipitation proceeds. The gelatinous cellulose derivative is then collected on a filter and further washed with a solution of sodium bicarbonate until sufficiently free from the by-products. It is then treated in a press or centrifugal machine to remove excess of solution and finally reconverted into viscose of a purified condition by treatment in a suitable vessel with sufficient strong caustic-soda solution to redissolve the cellulose derivative.

The sodium bicarbonate solution used in the treatment may be accompanied or succeeded by a solution of sodium sulfite of five per cent. strength to facilitate the removal of the by-products.

It is also advantageous in further washing the precipitated hydrate to use a solution containing about five per cent. of a neutral salt, such as sodium sulfate or sodium chlorid, by which washing the sodium bicarbonate used as precipitant may be eliminated, the neutral salt being used in order to prevent the product from redissolving during the washing treatment.

Having thus described the nature of this invention and the best means I know of carrying the same into practical effect, I claim—

1. A process of purifying viscose consisting in adding a solution of sodium bicarbonate to the viscose, washing the precipitate thus obtained with a solution of sodium bicarbonate, and finally dissolving the precipitate in caustic-alkali solution.

2. A process of purifying viscose consisting in adding a solution of sodium bicarbonate to the viscose, washing the precipitate thus obtained with a solution of sodium bicarbonate and sodium sulfite, and finally dissolving the precipitate in caustic-alkali solution.

3. A process of purifying viscose consisting in adding a solution of sodium bicarbonate to the viscose, washing the precipitate thus obtained with a solution of sodium bicarbonate and continuing the washing with a dilute solution of a neutral salt and finally dissolving the precipitate in caustic-alkali solution.

In testimony whereof I have signed my name to this specification in the presence of two subscribing witnesses.

CHARLES F. CROSS.

Witnesses:
WALTER JAMES SKERTEN,
EDWARD GARDNER.